(12) United States Patent
Kikaganeshwala et al.

(10) Patent No.: US 7,764,038 B2
(45) Date of Patent: Jul. 27, 2010

(54) DEVICES, SYSTEMS, AND METHODS FOR RELIEVING STRESS

(75) Inventors: Yagnesh Kikaganeshwala, Cincinnati, OH (US); William Finley, Harrison, OH (US); Joerg Ernst, Mason, OH (US); Jason Obermeyer, Hamilton, OH (US)

(73) Assignee: Siemens Industry, Inc., Alpharetta ( * ) Notice: Subject to any disclaimer, the term of this patent is extended or adjusted under 35 U.S.C. 154(b) by 469 days.

(21) Appl. No.: 11/944,948

(22) Filed: Nov. 26, 2007

(65) Prior Publication Data
US 2008/0265696 A1 Oct. 30, 2008

(51) Int. Cl.
*H02K 11/00* (2006.01)
*G01N 24/00* (2006.01)

(52) U.S. Cl. .............. 318/490; 318/450; 318/451; 318/460; 318/488; 73/570; 73/579; 73/662; 73/862.59

(58) Field of Classification Search .......... 318/114, 318/450, 451, 460, 488, 490; 73/570, 579, 73/582, 662, 663, 667, 862.59
See application file for complete search history.

(56) References Cited

U.S. PATENT DOCUMENTS

| | | | | |
|---|---|---|---|---|
| 4,419,894 A | * | 12/1983 | Matumoto | 73/462 |
| 4,823,599 A | | 4/1989 | Schneider | |
| 5,035,142 A | | 7/1991 | Dryga | |
| 6,026,687 A | * | 2/2000 | Jury | 73/582 |
| 6,289,735 B1 | * | 9/2001 | Dister et al. | 73/579 |
| 6,809,486 B2 | * | 10/2004 | Qiu et al. | 318/135 |
| 7,117,754 B2 | * | 10/2006 | Neely et al. | 73/862.333 |
| 2006/0283920 A1 | | 12/2006 | Chitty | |
| 2007/0040005 A1 | | 2/2007 | Iordache | |

OTHER PUBLICATIONS

Hebel, "Vibrational Conditioning of Metals", Jan. 1, 2004, Heat Treating Progress Magazine, U.S.

* cited by examiner

*Primary Examiner*—Bentsu Ro
*Assistant Examiner*—Thai Dinh
(74) *Attorney, Agent, or Firm*—Filip A. Kowalewski

(57) ABSTRACT

Certain exemplary embodiments comprise a method that can comprise, via a device that originates sub-harmonic vibrations, applying a vibration treatment, to a rotor of an electric motor for a predetermined time period. The rotor can be thermally sensitive. The vibration treatment can be adapted to reduce internal stresses in the rotor, thereby reducing a vibration level of the rotor.

19 Claims, 4 Drawing Sheets

3000

DEVICES, SYSTEMS, AND METHODS FOR RELIEVING STRESS

BACKGROUND

In manufacturing and/or assembling an electric induction motor, internal stresses can be present in a motor shaft of the motor due to variations in rotor manufacturing. For example, the copper bars inserted into a laminated core of the motor can bind in a slot during bar insertion. As another example, a shrink fit of a laminated core of the motor might be unequally distributed along a length of the motor shaft, causing internal stresses within the rotor. When the rotor heats up during operation of the motor, a thermal bow can result from a tendency of the rotor to attempt to equalize thermal stresses, which can cause vibrations in the motor. Thus, devices, systems, and/or methods of relieving stress in the can be desirable.

SUMMARY

Certain exemplary embodiments comprise a method that can comprise, via a device that originates sub-harmonic vibrations, applying a vibration treatment, to a rotor of an electric motor for a predetermined time period. The rotor can be thermally sensitive. The vibration treatment can be adapted to reduce internal stresses in the rotor, thereby reducing a vibration level of the rotor.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments provide a method that can comprise, via a device that originates sub-harmonic vibrations, applying a vibration treatment, to a rotor of an electric motor for a predetermined time period. The rotor can be thermally sensitive. The vibration treatment can be adapted to reduce internal stresses in the rotor, thereby reducing a vibration level of the rotor.

Certain exemplary embodiments provide a method that can be adapted to relieve internal stresses of a thermally sensitive rotor via vibratory stress relief. A thermally sensitive rotor can be identified via one or more vibration tests. The rotor can be removed from an electric motor. Stress can be relieved in the rotor via one or more of the following activities:

- one or more portions of the rotor can be tested for out of roundness;
- a key holding a core of the rotor in place axially can be cut and/or the rotor core can be free to move;
- an assembly comprising the rotor can be placed on two V-blocks that rotor positioned on the inboard side of each bearing, the V-blocks can be positioned at a substantially rigid portion of a shaft of the rotor;
- vibratory stress relief equipment can be positioned at a first end of the core of the rotor;
- a vibratory stress relief process can be performed at the first end of the core of the rotor;
- the vibratory stress relief equipment can be positioned at a second end of the core of the rotor;
- the vibratory stress relief process can be performed at the second end of the core of the rotor;
- the core of the rotor can be fixed axially onto the shaft of the rotor; and/or
- rotor dimensions can be checked to determine if a portion of the rotor has an out of roundness condition, which can provide information that can be used to machine the rotor.

In certain exemplary embodiments, a test can indicate that a harmonic frequency of a shaft of a rotor or a shaft assembly thereof. The harmonic frequency can be between approximately 35 and approximately 95 Hertz prior to an application of one or more vibration treatments. The harmonic frequency of the shaft can be repeatably measured to within 2 Hz after the application of vibration treatments according to certain exemplary embodiments.

Figure 1:
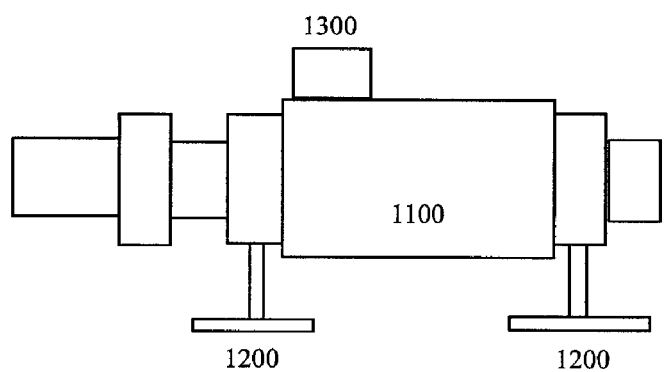
FIG. 1 is a side view of an exemplary embodiment of a system 1000.
Figure 2:
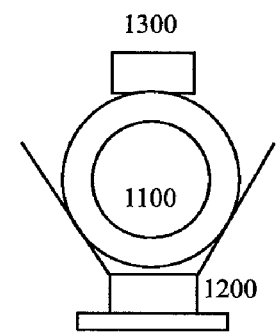
FIG. 2 is an end view of exemplary system 1000.

FIG. 1 is a side of an exemplary embodiment of a system 1000. FIG. 2 is an end view of exemplary system 1000. System 1000 can comprise a rotor 1100 of an electric motor. Rotor 1100 can be placed in a support 1200 prior to applying one or more vibration treatments to relieve stresses in rotor 1100. A device 1300 that can originate sub-harmonic vibrations can be directly attached to rotor 1100 to apply the one or more vibration treatments.

Figure 3:
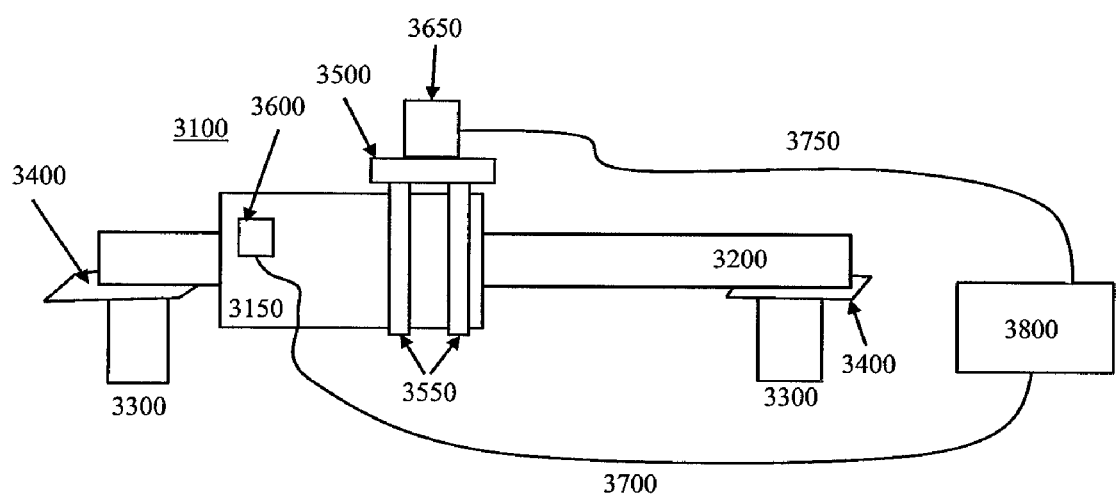
FIG. 3 is a block diagram of an exemplary embodiment of a system 3000.

FIG. 3 is a block diagram of an exemplary embodiment of a system 3000, which can comprise a rotor 3100. Rotor 3100 can comprise a shaft 3200. Rotor 3100 can be thermally sensitive and/or amenable to one or more vibration treatments for reducing internal stresses therein. Rotor 3100 can be coupled to a device 3650, which, under the control of a controller 3800, can originate sub-harmonic vibrations.

In certain exemplary embodiments, controller 3800 can be a META-LAX Vibrational Stress Relief Model 1701 (available from Bonal Technologies, Inc. of Royal Oak, Mich.). Rotor 3100 can be mounted for vibration treatment and a force inducer fixture 3500 can be attached thereto. Rotor 3100 can be cushioned in system 3000 via one or more rubber isolation pads 3400 that can be placed between rotor 3100 and a pair of V-blocks 3300.

Certain exemplary embodiments can comprise one or more of the following activities:

- two V-blocks 3300 can be positioned on a table (not illustrated) such that rotor 3100 is supported at or near one or more bearing locations on shaft 3200, such as in-board of the bearing locations;
- rubber isolation pads 3400 can be placed on V-blocks 3300;
- clamping bolts can be removed and one or more clamps 3550 can be opened to receive shaft 3200 of rotor 3100;
- shaft 3200 can be placed into V-block supports 3300;
- shaft 3200 can be positioned such that rotor core 3150 of rotor 3100 is substantially horizontal relative to a surface of the table;
- rubber isolation pads 3400 can be tested to verify a relatively secure placement between V-blocks 3300 and shaft 3200;
- an upper portion of force inducer fixture 3500 can be positioned as close to on one end of core 3150 of rotor 3100 as possible;

clamps 3550 can be bolted via the clamping bolts to releasably and/or securely attach force inducer fixture 3500 to rotor 3100;

a transducer 3600 can be clamped in an approximately vertical orientation onto a horizontal bar on core 3150 within approximately three feet of a force inducer 3650;

a transducer cord 3700 and/or a force inducer cord 3750 can be connected via a plug into the back of a controller 3800 of force inducer 3650; and/or a date, order number, unit, shaft part number, and/or operator clock number can be recorded on a vibratory stress relief data sheet.

Figure 4:
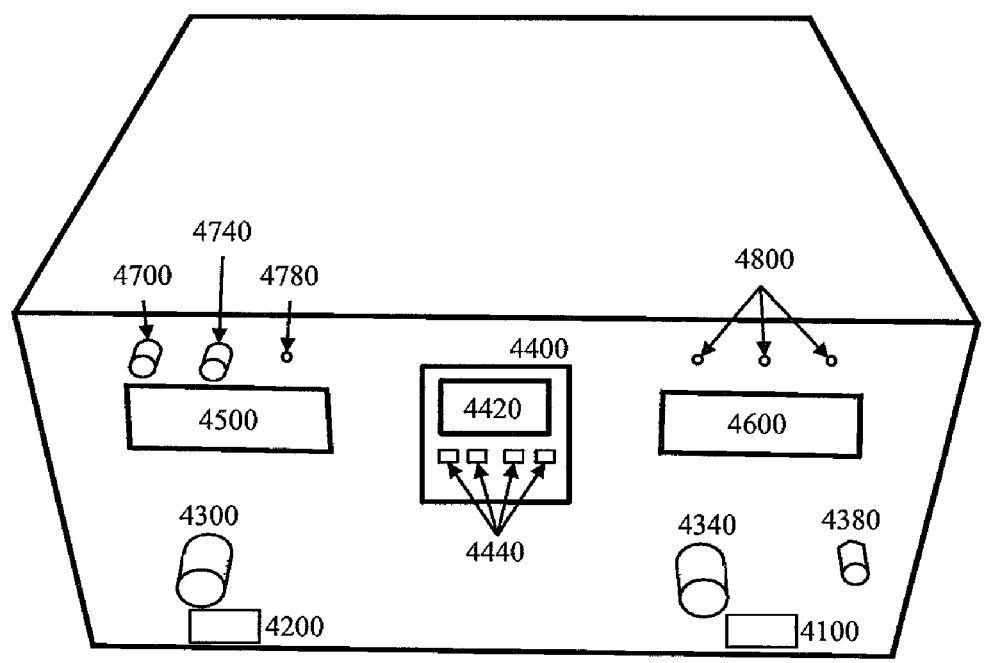
FIG. 4 is a schematic representation of an exemplary embodiment of a controller 4000 of a device adapted to originate sub-harmonic vibrations.

FIG. 4 is a schematic representation of an exemplary embodiment of a controller 4000 (such as controller 3800 of FIG. 3) that is adapted to control a device (such as a force inducer 3650 of FIG. 3) that originates sub-harmonic vibrations.

Certain exemplary embodiments provide a method that can comprise one or more of the following activities:

a vibration sensitivity control 4300 of controller 4000 can be adjusted to a setting of "rigid";

a frequency tuner control 4340 can be adjusted such that a setting of "000" is indicated on a vibration level meter 4600 of controller 4000;

a timer switch 4200 of controller 4000 can be set to an "off" position;

a power switch 4100 of controller 4000 can be turned to "on";

a user can verify that one or more of fault lights 4800 are illuminated;

a button 4740 adapted to test a transducer (not illustrated) can be pressed;

a user can verify that the transducer is working, responsive to pressing button 4740, via an illumination of an indicator 4780 comprised by controller 4000;

a frequency tuner button 4380 can be depressed, which can allow a vibration frequency applied to the rotor to increase at a rate between approximately one and two Hertz per second;

the user can monitor vibration level meter 4600 comprised by controller 4000, which can indicate a relatively rapid rise when applied vibrations approach a harmonic frequency of the rotor;

if a displayed value on vibration level meter 4600 exceeds a range of the display, such as a value that exceeds 199 (that might cause the meter might go blank or indicate a value of "1"), the user can adjust vibration sensitivity control 4300 until vibration level meter 4600 provides desired values, the user can continue adjusting vibration sensitivity control 4300 until a value of approximately "150" is displayed on vibration level meter 4600;

the user can press frequency tuner button 4380, which can cause the device adapted to originate sub-harmonic vibrations to continue to increase a vibration frequency until a number on vibration level meter 4600 decreases as the vibration frequency increases, which can be indicative of a point of a first harmonic frequency for the shaft, which can be between approximately 35 and approximately 95 Hertz; and/or frequency tuner control 4340 can be adjusted such that a setting of "000" is indicated on a vibration level meter 4600 of controller 4000.

Certain exemplary embodiments provide a method that can comprise performing a first vibration treatment to the rotor, which can comprise one or more of the following activities:

a. frequency tuner button 4380 can be pressed and/or the first harmonic frequency of the rotor can be verified;

b. the first harmonic frequency can be logged and/or recorded, such as on the vibratory stress relief data sheet under a label indicative of the first vibration treatment;

c. while the device adapted to originate sub-harmonic vibrations is inducing vibrations at approximately the harmonic peak frequency, the user can press and hold a "⅓" frequency button 4700 until vibration level meter 4500 has a reading that stabilizes at a value and the user can note the value;

d. frequency tuner control 4340 can be adjusted such that a setting of "000" is indicated on a vibration level meter 4600 of controller 4000;

e. the user can press frequency tuner button 4380 and/or slowly increase a frequency reading to approximately four Hertz less than the first harmonic frequency and a vibration level at that frequency can be noted and/or recorded;

f. if the vibration level reading obtained in activity e is higher than the reading obtained in activity c, the user can reduce the vibration frequency slowly by approximately 2-4 Hz until the vibration level reading falls below the reading obtained in activity c and record this frequency as a sub-harmonic stress relieving frequency in a column, which can be labeled "M-LSR FREQ" under a "first scan label on the data sheet;

g. a timer 4400 can be set for a cycle of approximately 20 minutes pressing one or more timer adjustment buttons 4440 until a value indicative of 20 minutes is displayed on timer display 4420; and/or h. timer switch 4200 can be set to "on", which can begin the vibration treatment via a countdown of timer 4400, certain exemplary device adapted to originate sub-harmonic vibrations can be adapted to automatically end the vibration treatment after the cycle indicated by timer 4400 is complete.

Certain exemplary embodiments provide a method that can comprise performing a second vibration treatment to the rotor, which can comprise one or more of the following activities:

aa. subsequent to the first vibration treatment, the user can adjust frequency tuner control 4340 until a value of approximately "000" is displayed on vibration level meter 4600;

bb. timer switch 4200 can be adjusted to an "off" position;

cc. frequency tuner button 4380 can be pressed;

dd. the user can increase the vibration frequency until a displayed value on vibration level meter 4500 decreases as the vibration frequency increases;

ee. the displayed value of activity dd can be recorded as a second harmonic frequency, which can be changed from the first harmonic frequency value on the data sheet under a label of "second scan";

ff. the user can press the "⅓" frequency button 4700 and a displayed value of vibration level meter 4500 can be recorded;

gg. the user can adjust frequency tuner control 4340 until a value of approximately "000" is displayed on vibration level meter 4600;

hh. the frequency can be slowly adjusted to a value that is approximately four Hertz below the second harmonic frequency value;

ii. the value displayed on vibration level meter 4600 can be checked and if the value is higher than the value determined in activity ff, the vibration frequency can be reduced by between approximately two Hertz and four Hertz until the reading falls below the value determined in activity ff, the resulting vibration meter value can be recorded as a sub-harmonic stress relieving frequency in a column, which can be labeled "M-LSR FREQ", under a "second scan" label on the data sheet;

jj. timer 4400 can be set for approximately 10 minutes via one or more timer adjustment buttons 4440 until a value indicative of 10 minutes is displayed on timer display 4420; and/or kk. timer switch 4200 can be turned on to invoke the second vibration treatment.

Certain exemplary embodiments provide a method that can comprise performing a third vibration treatment to the rotor, which can comprise one or more of the following activities:

aaa. after the second vibration treatment has been completed, the user can adjust frequency tuner control 4340 until a value of approximately "000" is displayed on vibration level meter 4600;

bbb. timer switch 4200 can be adjusted to an off position;

ccc. find a third harmonic frequency as described in activities cc-dd;

ddd. the value of the third harmonic frequency can be recorded under a "third scan" label on the data sheet;

eee. if the third harmonic frequency is within approximately two Hertz of the second harmonic frequency, a determination can be made that no additional vibration treatments will be performed; and/or fff. if the third harmonic frequency is within approximately two Hertz of the second harmonic frequency, a third harmonic vibration treatment can be performed following one or more of the activities described in activities ff-kk.

Certain exemplary embodiments provide a method that can comprise performing a fourth vibration treatment to the rotor, which can comprise repeating the steps of activities aaa-fff. In certain exemplary embodiments, if the fourth harmonic frequency is not within 2 Hz of the frequency recorded as the third harmonic frequency, a determination can be made to not perform any further vibration treatments.

In certain exemplary embodiments, after vibration treatments have been completed:

power button 4100 can be turned off and/or the user can adjust frequency tuner control 4340 until a value of approximately "000" is displayed on vibration level meter 4600;

vibration sensitivity control 4300 of controller 4000 of the device adapted to originate sub-harmonic vibrations can be adjusted to a setting of "rigid";

timer switch 4200 can be set to an "off" position;

the transducer can be unclamped and/or removed;

the force inducer fixture can be unclamped and/or removed; and/or the shaft can be removed from the V-blocks, such as via a crane.

Figure 5:
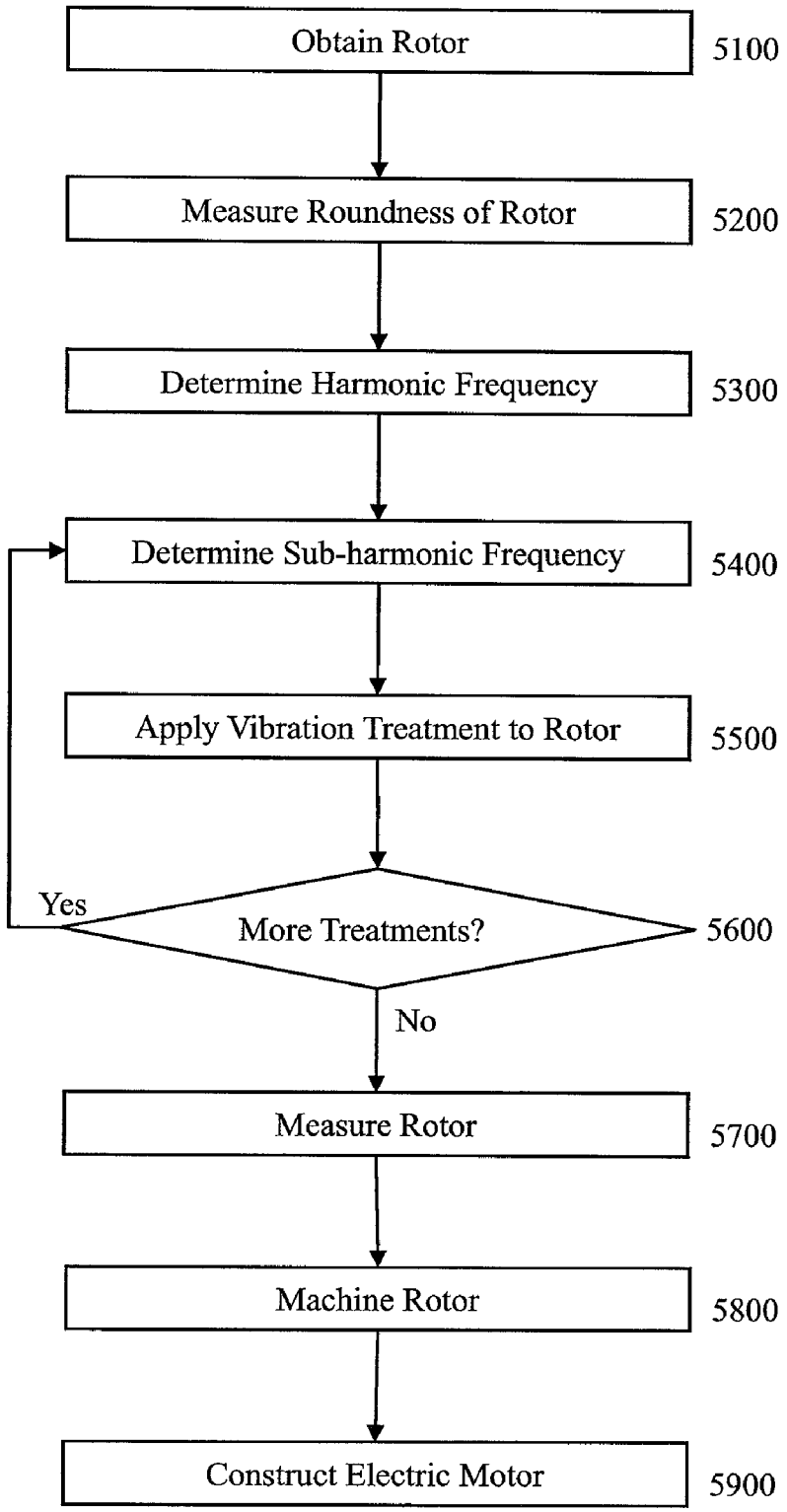
FIG. 5 is a flowchart of an exemplary embodiment of a method 5000.

FIG. 5 is a flowchart of an exemplary embodiment of a method 5000. At activity 5100, a rotor of an electric motor can be obtained. In certain exemplary embodiments, a determination can be made that the rotor is thermally sensitive. In certain exemplary embodiments, a shaft and a core of the rotor might not be coupled via a key. For example, the key can be removed responsive to a determination to provide a vibration treatment to the rotor. The laminations of the rotor can be strapped to prevent flaring of the laminations relative to the shaft. In certain exemplary embodiments, prior to a first vibration treatment, the rotor can be mounted on two V-blocks. Each V-block can be positioned on an inboard side of a shaft bearing mounting location of the rotor.

At activity 5200, a roundness of the rotor can be determined at one or more locations on the rotor. The roundness of the rotor can be indicative of a shape of the rotor.

At activity 5300, a harmonic frequency can be determined and/or measured. A device that originates sub-harmonic vibrations can be placed and/or releasably attached to the rotor. The device can be placed and/or directly attached to a first end of the rotor. The harmonic frequency can be determined via the device. In certain exemplary embodiments, a determination can be made that the harmonic vibration frequency of the rotor is between approximately 35 Hertz and approximately 95 Hertz as a precondition to a first vibration treatment of the rotor.

At activity 5400, a sub-harmonic frequency can be determined. The device can be utilized to determine the sub-harmonic frequency. The sub-harmonic frequency can be determined based upon the harmonic or resonance frequency.

At activity 5500, a vibration treatment can be applied to the rotor. The device can induce vibrations in the rotor and/or a shaft thereof for a predetermined time period. The vibration treatment can be at a first sub-harmonic frequency determined via activity 5400. The vibration treatment can be adapted to reduce internal stresses in the rotor, thereby reducing a measured vibration level of the rotor. In certain exemplary embodiments, a second vibration treatment can be applied to the rotor at the first end of the rotor responsive to a determination that the harmonic frequency of the rotor has changed by greater than a predetermined threshold responsive to the treatment.

In certain exemplary embodiments the device can be relocated and/or directly attached to a second end of the rotor to apply one or more vibration treatments to the second end of the rotor. A separate determination of a harmonic frequency can be made at the second end of the rotor. The harmonic frequency of the second end of the rotor can be used to determine a second sub-harmonic frequency at which to apply a first vibration treatment to the second end of the rotor.

At activity 5600, a determination can be made regarding whether to apply an additional vibration to the rotor. If an additional vibration treatment is applied, activity 5400 and/or 5500 can be repeated. For example, a decision can be made to apply an additional vibration treatment at a new determined sub-harmonic vibration frequency for a new predetermined time period if a difference in determined harmonic vibration frequencies between applications of sub-harmonic vibrations is greater than approximately 2 Hertz. Vibration treatments can be applied until a predetermined count of vibration treatments have been applied and/or until a difference in determined harmonic vibration frequencies between applications of sub-harmonic vibrations is less than approximately 2 Hertz.

At activity 5700, the rotor can be measured for roundness at one or more locations on the rotor. The roundness can be indicative of whether to machine the rotor subsequent to one or more vibration treatments. The core can be axially attached to the core subsequent to one or more vibration treatments.

At activity 5800, the rotor can be machined responsive to a measure of roundness that is outside of a predetermined range. The rotor can be machined such that a measure of roundness of the rotor is within the predetermined range.

At activity 5900, the electric motor can be constructed utilizing the rotor. The key can be installed between the shaft and the core of the rotor.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

- a—at least one.
- activity—an action, act, deed, function, step, and/or process and/or a portion thereof.
- adapted to—suitable, fit, and/or capable of performing a specified function.
- and/or—either in conjunction with or in alternative to.
- apparatus—an appliance or device for a particular purpose.
- applied—incident directly and/or indirectly upon.
- applying—to put to use for a purpose.
- approximately—about and/or nearly the same as.
- associated with—related to.
- at least—not less than.
- attach—to fasten, secure, and/or join.
- automatically—acting and/or operating in a manner essentially independent of external human influence and/or control. For example, an automatic light switch can turn on upon "seeing" a person in its view, without the person manually operating the light switch.
- axial—located on, around, or in the direction of an axis.
- based upon—determined in consideration of and/or derived from.
- bearing—a device that supports, guides, and reduces the friction of motion between fixed and moving machine parts.
- between—in a separating interval and/or intermediate to.
- can—is capable of, in at least some embodiments.
- capable—a potential for use.
- cause—to bring about, provoke, precipitate, produce, elicit, be the reason for, result in, and/or effect.
- component—a constituent element and/or part.
- comprised by—included by.
- comprise—to include but not be limited to.
- core—a portion of a rotor comprising components in which a current is induced.
- couple—to join, connect, and/or link two things together.
- define—to establish the meaning, relationship, outline, form, and/or structure of; and/or to precisely and/or distinctly describe and/or specify.
- determine—to find and/or decide upon.
- device—a machine, manufacture, and/or collection thereof.
- difference—a value obtained via a subtraction of a first quantity from a second quantity.
- directly—without anything in between and/or intervening.
- during—at some time in a time interval.
- each—every one of a group considered individually.
- electric motor—a motion-imparting device powered by electricity.
- end—an extremity and its vicinity of something that has length; a terminus.
- energy—usable power.
- flare—to spread outwardly, typically with respect to a central axis.
- for—with a purpose of.
- frequency—the number of times a specified periodic phenomenon occurs within a specified interval.
- from—used to indicate a source.
- further—in addition.
- generate—to create, produce, render, give rise to, and/or bring into existence.
- greater than—larger and/or more than.
- group—a plurality of determined units.
- have—to be identified by.
- harmonic frequency—a
- Hertz (Hz)—an abbreviation for Hertz, which is a unit of frequency equal to one cycle per second.
- inboard—toward a center of an object.
- indicative—serving to indicate.
- induce—to bring about or cause to occur.
- installing—the act of setting in position and preparing for use.
- key—a device that radially constrains two objects such as a fan and a shaft.
- lamination—a thin metallic sheet coated to increase the resistance from sheet to sheet, to carry flux from stator to rotor and, and to help transfer heat away from the conductor bars.
- length—a longest dimension of something and/or the measurement of the extent of something along its greatest dimension.
- less than—having a measurably smaller magnitude and/or degree as compared to something else.
- level—a relative position on a scale and/or a position along a vertical axis indicating height and/or depth.
- location—a place.
- machine—(n) a device and/or vehicle adapted to perform at least one task. (v) to cut, shape, and/or finish via a machine.
- may—is allowed and/or permitted to, in at least some embodiments.
- measure—to determine, as a dimension, quantification, and/or capacity, etc. by observation.
- method—a process, procedure, and/or collection of related activities for accomplishing something.
- more—in greater quantity.
- mounting—a process of attaching one thing to another.
- not—a negation of something.
- obtain—to receive, get, take possession of, procure, acquire, calculate, determine, and/or compute.
- one—a single unit.
- place—to put in a particular place or position.
- plurality—the state of being plural and/or more than one.
- positioned—to put in place or position.
- precondition—a predicate that must occur prior to an invocation of a subsequent action.
- predetermined—established in advance.
- prevent—to impede, hinder, stop, and/or keep from happening.
- prior—before in time.
- provide—to furnish, supply, give, convey, send, and/or make available.
- range—a measure of an extent of a set of values and/or an amount and/or extent of variation.
- receive—to gather, take, acquire, obtain, accept, get, and/ or have bestowed upon.
- reduce—to make and/or become lesser and/or smaller.
- regarding—pertaining to.

remove—to de-couple, detach, and/or shift a position and/or location of.

resonance frequency—a rotor—a rotating portion of a machine.

roundness—a measurable degree to which a curved surface resembles a circle.

said—when used in a system or device claim, an article indicating a subsequent claim term that has been previously introduced.

selected—a chosen item.

shaft—a long, generally cylindrical bar that is adapted to rotate about a longitudinal axis and to transmit power.

side—a surface bounding a solid object.

speed—a linear, curvilinear, and/or angular velocity and/or a linear, curvilinear, and/or angular distance traveled during a predetermined time interval.

strapped—secured via a placement of one or more bands that are adapted to restrain motion of an object and/or system in at least one direction.

sub-harmonic—a frequency that is less than a harmonic frequency of a predetermined object and/or system.

subsequent—following in time.

substantially—to a considerable, large, and/or great, but not necessarily whole and/or entire, extent and/or degree.

time—a measurement of a point in a nonspatial continuum in which events occur in apparently irreversible succession from the past through the present to the future.

time period—an interval of time.

treatment—administration or application of one or more means adapted to improve a predetermined condition.

system—a collection of mechanisms, devices, data, and/or instructions, the collection designed to perform one or more specific functions.

utilize—to use and/or put into service.

V-block—a notched solid in which the notch is adapted to cradle a substantially round shaft.

via—by way of and/or utilizing.

vibrate—to move back and forth or to and fro, especially rhythmically and/or rapidly.

wherein—in regard to which; and; and/or in addition to.

whether—used to introduce alternative possibilities.

width—a measurement of the extent of something along a dimension.

within—inside.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, abstract, drawing figure, etc.) of this application, other than the claims themselves, is to be regarded as illustrative in nature, and not as restrictive.

What is claimed is:

1. A method comprising:

via a device that originates sub-harmonic vibrations, said device directly attached to a first end of a rotor of an electric motor, applying a first vibration treatment, at a first predetermined sub-harmonic frequency, to said first end of said rotor of said electric motor for a first predetermined time period, said rotor thermally sensitive, said first predetermined sub-harmonic frequency determined based upon a measured first harmonic or resonance frequency, laminations of said rotor strapped to prevent flaring, a shaft and a core of said rotor not coupled via a key, said first vibration treatment adapted to reduce internal stresses in said rotor, thereby reducing a vibration level of said rotor.

2. The method of claim 1, further comprising:

applying a second vibration treatment applied to a second end of said rotor, said second vibration treatment at a second determined sub-harmonic frequency.

3. The method of claim 1, further comprising:

measuring a roundness of said rotor, said roundness indicative of a shape of said rotor.

4. The method of claim 1, further comprising:

prior to said first vibration treatment, removing said key.

5. The method of claim 1, further comprising:

prior to said first vibration treatment, mounting said rotor on two V-blocks, each V-block positioned on an inboard side of a shaft bearing mounting location of said rotor.

6. The method of claim 1, further comprising:

placing said device that originates sub-harmonic vibrations on said first end of said rotor.

7. The method of claim 1, further comprising:

determining that said first harmonic vibration frequency of said rotor is between approximately 35 Hertz and approximately 95 Hertz as a precondition to said first vibration treatment.

8. The method of claim 1, further comprising:
determining said first sub-harmonic vibration frequency.

9. The method of claim 1, further comprising:
determining a harmonic vibration frequency of said first end of said rotor, and
determining said first sub-harmonic vibration frequency based upon said harmonic vibration frequency.

10. The method of claim 1, further comprising:
determining a first harmonic vibration frequency of said first end of said rotor
determining a second harmonic vibration frequency of said first end of said rotor;
determining a second sub-harmonic vibration frequency based upon said second harmonic frequency; and
applying a second vibration treatment at said second determined sub-harmonic vibration frequency for a second predetermined time period.

11. The method of claim 1, further comprising:
determining a first harmonic vibration frequency of said first end of said rotor
determining a second harmonic vibration frequency of said first end of said rotor; and
applying a second vibration treatment at a second determined sub-harmonic vibration frequency for a second predetermined time period if a difference between said first harmonic vibration frequency and said second harmonic vibration frequency is greater than approximately 2 Hertz.

12. The method of claim 1, further comprising:
placing said device that originates sub-harmonic vibrations on a second end of said rotor.

13. The method of claim 1, further comprising:
placing said device that originates sub-harmonic vibrations on a second end of said rotor; and
determining a harmonic vibration frequency of said second end of said rotor;
determining a second sub-harmonic vibration frequency based upon said harmonic vibration frequency of said second end of said rotor, and
applying a second vibration treatment, at a second determined sub-harmonic frequency, to said second end of said rotor of said electric motor for a second predetermined time period.

14. The method of claim 1, further comprising:
determining a first harmonic vibration frequency of a second end of said rotor
determining a second harmonic vibration frequency of said second end of said rotor;
determining a second sub-harmonic vibration frequency based upon said second harmonic vibration frequency; and
applying a second vibration treatment, at a second determined sub-harmonic frequency, to said second end of said rotor of said electric motor for a second predetermined time period.

15. The method of claim 1, further comprising:
determining a first harmonic vibration frequency of a second end of said rotor;
determining a second harmonic vibration frequency of said second end of said rotor;
determining a second sub-harmonic vibration frequency based upon said second harmonic vibration frequency; and
applying a second vibration treatment at said second determined sub-harmonic vibration frequency if a difference between said first harmonic vibration frequency and said second harmonic vibration frequency is greater than approximately 2 Hertz.

16. The method of claim 1, further comprising:
installing said key between said shaft and said core.

17. The method of claim 1, further comprising:
axially attaching said core to said shaft at one end.

18. The method of claim 1, further comprising:
axially attaching said core to said shaft at one end; and
machining said rotor such that a measure of roundness of said rotor is within a predetermined range.

19. A method comprising:
reducing a measured vibration level of an electric motor rotor via a vibration treatment applied at a determined sub-harmonic frequency to a first end of said rotor for a predetermined time period by a device that originates sub-harmonic vibrations, said device directly attached to an end of said rotor of said electric motor, laminations of said rotor strapped, during said treatment, to prevent flaring, a shaft and a core of said rotor not coupled via a key during said treatment.

* * * * *

UNITED STATES PATENT AND TRADEMARK OFFICE
CERTIFICATE OF CORRECTION

PATENT NO. : 7,764,038 B2 Page 1 of 1
APPLICATION NO. : 11/944948
DATED : July 27, 2010
INVENTOR(S) : Kikaganeshwala It is certified that error appears in the above-identified patent and that said Letters Patent is hereby corrected as shown below:

Title Page; item (63); insert;
--Related U.S. Application Data
Provisional application No. 60/914,142, filed on April 26, 2007--

Signed and Sealed this

Twenty-eighth Day of September, 2010

David J. Kappos
*Director of the United States Patent and Trademark Office*